(12) United States Patent
Kobayashi et al.

(10) Patent No.: US 9,791,599 B2
(45) Date of Patent: Oct. 17, 2017

(54) IMAGE PROCESSING METHOD AND IMAGING DEVICE

(71) Applicant: Kabushiki Kaisha Toshiba, Minato-ku (JP)

(72) Inventors: Mitsuyoshi Kobayashi, Ota (JP); Risako Ueno, Meguro (JP); Kazuhiro Suzuki, Minato (JP); Honam Kwon, Kawasaki (JP); Hideyuki Funaki, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 235 days.

(21) Appl. No.: 14/658,686

(22) Filed: Mar. 16, 2015

(65) Prior Publication Data

US 2015/0268385 A1 Sep. 24, 2015

(30) Foreign Application Priority Data

Mar. 24, 2014 (JP) ................................ 2014-060083

(51) Int. Cl.
*G01B 11/14* (2006.01)
*G02B 1/00* (2006.01)
(Continued)

(52) U.S. Cl.
CPC ............ *G02B 3/0037* (2013.01); *G01B 11/14* (2013.01); *G06K 9/209* (2013.01); *G06K 9/32* (2013.01); *G06K 9/42* (2013.01); *G06K 9/6202* (2013.01)

(58) Field of Classification Search
CPC .... H04N 5/232; G06T 7/0075; G02B 3/0056; G03B 1/00
(Continued)

(56) References Cited

U.S. PATENT DOCUMENTS 7,732,744 B2   6/2010  Utagawa
2012/0050589 A1   3/2012  Ueno et al.
(Continued)

FOREIGN PATENT DOCUMENTS

CN   101065955 A   10/2007
CN   101206395 A   6/2008
(Continued)

OTHER PUBLICATIONS

T. Georgiev, et al., "Reducing Plenoptic Camera Artifacts" Computer Graphics forum, vol. 29, No. 6, 2010, pp. 1955-1968.

*Primary Examiner* — Jeremaiah C Hallenbeck-Huber
*Assistant Examiner* — Albert Kir
(74) *Attorney, Agent, or Firm* — Oblon, McClelland, Maier & Neustadt, L.L.P.

(57) ABSTRACT

According to an embodiment, an image processing method is implemented in an imaging device that includes a microlens array including microlenses, a main lens configured to guide light from a photographic subject to the microlens array, and an image sensor configured to receive the light after passing through the main lens and the microlens array. The method includes: obtaining an image captured by the image sensor; setting, according to an image height, an arrangement of a microlens image of interest and comparison-target microlens images from among microlens images that are included in the image and that are formed by the microlenses; detecting an amount of image shift between the microlens image of interest and each of the comparison-target microlens images by comparing the microlens image of interest with the comparison-target microlens images; and calculating a distance corresponding to the microlens image of interest using the amounts of image shift.

7 Claims, 12 Drawing Sheets

(51) Int. Cl.
  *G02B 3/00* (2006.01)
  *G06K 9/62* (2006.01)
  *G06K 9/20* (2006.01)
  *G06K 9/32* (2006.01)
  *G06K 9/42* (2006.01)

(58) Field of Classification Search
  USPC ............... 348/222.1, 340; 382/106; 359/618
  See application file for complete search history.

(56) References Cited

U.S. PATENT DOCUMENTS

| 2012/0218448 | A1 | 8/2012 | Ueno et al. |
| 2013/0169837 | A1* | 7/2013 | Nagasaka ............... H04N 5/232 348/222.1 |
| 2014/0153783 | A1* | 6/2014 | Tao ....................... G06T 7/0075 382/106 |

FOREIGN PATENT DOCUMENTS

| CN | 101610353 A | 12/2009 |
| CN | 102439979 A | 5/2012 |
| CN | 103188443 A | 7/2013 |
| JP | 2001-266152 A | 9/2001 |
| JP | 2007-004471 A | 1/2007 |
| JP | 2009-047735 A | 3/2009 |
| JP | 2011-160344 A | 8/2011 |
| JP | 2012-049257 A | 3/2012 |
| JP | 2012-178693 A | 9/2012 |

\* cited by examiner

IMAGE PROCESSING METHOD AND IMAGING DEVICE

CROSS-REFERENCE TO RELATED APPLICATION

This application is based upon and claims the benefit of priority from Japanese Patent Application No. 2014-060083, filed on Mar. 24, 2014; the entire contents of which are incorporated herein by reference.

FIELD

Embodiments described herein relate generally to an image processing method and an imaging device.

BACKGROUND

In regard to an imaging technology in which the distance in the depth direction can be obtained as two-dimensional array information, various methods are being studied such as a method of using a reference beam or a method of performing stereo distance measurement using a plurality of cameras. In recent years, as new distance measuring devices for civilian use, there is a high demand for products having a relatively moderate price.

In such imaging technology for obtaining distances, the triangulation method using parallaxes is known as one of the imaging methods in which a reference beam is not used with the aim of holding down the system cost. As the types of camera capable of implementing the triangulation method, a stereo camera and a multiple camera are known. However, in a stereo camera or a multiple camera, a plurality of cameras is used. Hence, there is a risk of an increase in the failure rate due to an increase in the size of the system or an increase in the number of components.

Meanwhile, regarding an imaging optical system, a structure has been proposed in which a microlens array is disposed on the upper side of pixels; a plurality of pixels is arranged in the lower part of each microlens; and an image from a main lens is further formed on the pixels using the microlens array. In this structure, a group of images having parallaxes can be obtained in the units of pixel blocks. The parallaxes enable performing a refocussing process based on distance estimation and distance information of a photographic subject. An optical configuration in which an image from a main lens is further formed using a microlens array is called a refocus optical system.

In a configuration in which the refocus optical system is used, the image formed due to each microlens is an image taken by shifting the position of the same photographic subject captured in the adjacent image. Hence, if the images formed due to the microlenses are superimposed while shifting positions thereof; it becomes possible to reconstruct a refocused image focused at an arbitrary specified distance in the image. Moreover, as a result, it becomes possible to obtain the distance to the position of the photographic subject specified in the images.

In a microlens array, in an area away from the optical axis of the main lens and having a greater image height, the microlens images undergo deformation due to vignetting. Thus, if an identical matching method is implemented in an area having a greater image height and in an area closer to the optical axis of the main lens and having a smaller image height, then there is a risk of a decline in the distance detection accuracy due to false detection of microlens edges or due to the matching error attributed to image distortion.

DETAILED DESCRIPTION

According to an embodiment, an image processing method is implemented in an imaging device that includes a microlens array including a plurality of microlenses, a main lens configured to guide light from a photographic subject to the microlens array, and an image sensor configured to receive the light after passing through the main lens and the microlens array. The method includes: obtaining an image captured by the image sensor; setting, according to an image height, an arrangement of a microlens image of interest and a plurality of comparison-target microlens images from among microlens images that are included in the image and that are formed by the microlenses; detecting an amount of image shift between the microlens image of interest and each of the comparison-target microlens images by comparing the microlens image of interest with the comparison-target microlens images; and calculating a distance corresponding to the microlens image of interest using the amounts of image shift.

Figure 1:
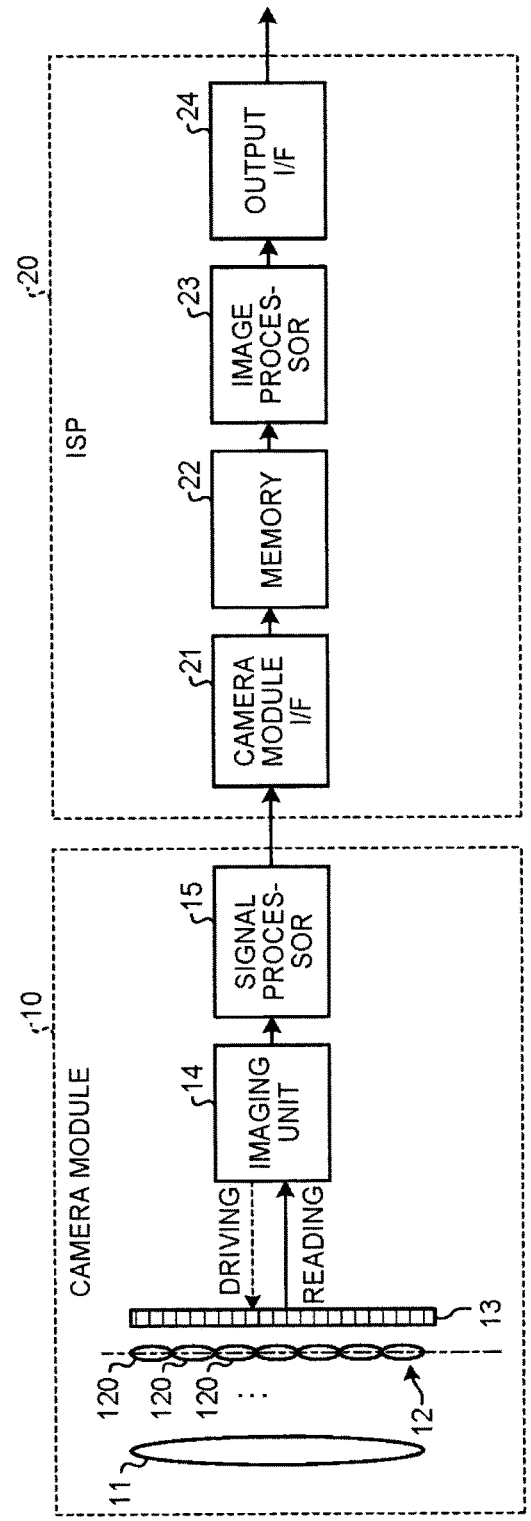
FIG. 1 is a block diagram illustrating an exemplary configuration of an imaging device that can be implemented in an embodiment.

An exemplary embodiment of an image processing method and an imaging device is described below. In FIG. 1 is illustrated an exemplary configuration of an imaging device that can be implemented in the embodiment. With reference to FIG. 1, an imaging device 1 includes a camera module 10 functioning as a lens unit and includes an image signal processor (ISP) 20.

The camera module 10 includes an imaging optical system having a main lens 11; a solid-state image sensor having a microlens array 12 and an image sensor 13; an imaging unit 14; and a signal processor 15. The imaging optical system includes one or more lenses, and guides the light coming from a photographic subject to the microlens array 12 and the image sensor 13. Of the lenses included in the imaging optical system, the main lens 11 is assumed to be the lens positioned closest to the image sensor 13.

As far as the image sensor 13 is concerned; for example, a charge coupled device (CCD) or a CMOS imager (CMOS stands for Complementary Metal Oxide Semiconductor) is used. Moreover, the image sensor 13 includes a pixel array of a plurality of pixels, each of which converts the received light into an electrical signal by means of photoelectric conversion and outputs the electrical signal.

The microlens array 12 includes a plurality of microlenses 120 arranged according to predetermined rules. Regarding a group of light beams that result in the formation of an image on an image forming surface due to the main lens 11, the microlens array 12 re-forms the image in a reduced manner in pixel blocks each of which includes a plurality of pixels on the image sensor 13 and corresponds to one of the microlenses 120. Herein, it is assumed that the main lens 11 is round in shape, and that the optical axis of the main lens 11 is coincident with the center of an effective pixel area in the image sensor 13.

Meanwhile, with respect to the microlens array 12, a color filter array can be disposed on the side of the image sensor 13 or on the side of the main lens 11. The color filter array includes color filters of a plurality of colors. Of the color filters of a plurality of colors, each color filter is configured to correspond to one of the microlenses 120.

The camera module 10 can be configured in such a way that, for example, the imaging optical system including the main lens 11 is separated from the other portion, thereby making it possible to replace the main lens 11. However, that is not the only possible case. Alternatively, the camera module 10 can be configured as a unit in which the imaging optical system, which includes the main lens 11, and the microlens array 12 are housed in a single housing. In that case, the entire unit including the imaging optical system and the microlens array 12 becomes replaceable.

The imaging unit 14 includes a driver circuit for driving each pixel of the image sensor 13. The driver circuit includes, for example, a vertical selection circuit for sequentially selecting the pixels to be driven in the vertical direction in the units of horizontal lines (rows); a horizontal selection circuit for sequentially selecting the pixels to be driven in the vertical direction in the units of columns; and a timing generator that drives the vertical selection circuit and the horizontal selection circuit at various pulses. The imaging unit 14 reads, from the pixels selected by the vertical selection circuit and the horizontal selection circuit, the electrical charge obtained by means of photoelectrical conversion of the received light; converts the electrical charge into electrical signals; and outputs the electrical signals.

With respect to the analog electrical signals output from the imaging unit 14; the signal processor 15 performs gain adjustment, noise removal, and amplification. Moreover, the signal processor 15 includes an A/D conversion circuit for converting the processed signals into digital signals and outputting them as image data of a RAW image.

The ISP 20 includes a camera module I/F 21, a memory 22, an image processor 23, and an output I/F 24. The camera module I/F 21 is an interface for signals with respect to the camera module 10. The image data of a RAW image that is output from the signal processor 15 of the camera module 10 is stored in, for example, the memory 22, which is a frame memory, via the camera module I/F 21.

From the image data of a RAW image stored in the memory 22, the image processor 23 obtains images (called microlens images) that are formed when the light coming from the microlenses 120 falls on the image sensor 13. Then, of the obtained microlens images, the image processor 23 compares the microlens image of interest with comparison-target microlens images serving as the comparison targets for comparison. According to the comparison results, the image processor 23 obtains amounts of image shift between the microlens image of interest and the comparison-target microlens images; and calculates the distance between the microlens image of interest and the photographic subject based on the obtained amounts of image shift.

The distance values calculated for the microlens images are then output, for example, in the form of a distance map from the output I/F 24.

Meanwhile, instead of storing the image data in the memory 22, it can be stored in an external memory medium. In that case, the image data read from the external memory medium is stored in the memory 22 via, for example, the camera module I/F 21. Then, the image processor 23 performs distance calculation. Thus, it becomes possible to obtain a distance map at a desired timing.

Of the image data stored in the memory 22, based on the image data which is formed on the basis of the light coming from the microlens array 12; the image processor 23 performs a refocusing process (described below) and can obtain a refocused image. That is, with respect to the image data read from the memory 22, the image processor 23 performs a refocussing process in which the image of the area corresponding to each microlens 120 is enlarged and the enlarged images are superimposed while shifting positions thereof, and obtains a refocused image that has been reconstructed. Then, the refocused image is output from the output I/F 24 and is either displayed on a display device (not illustrated) or stored in an external memory medium.

Figure 2:
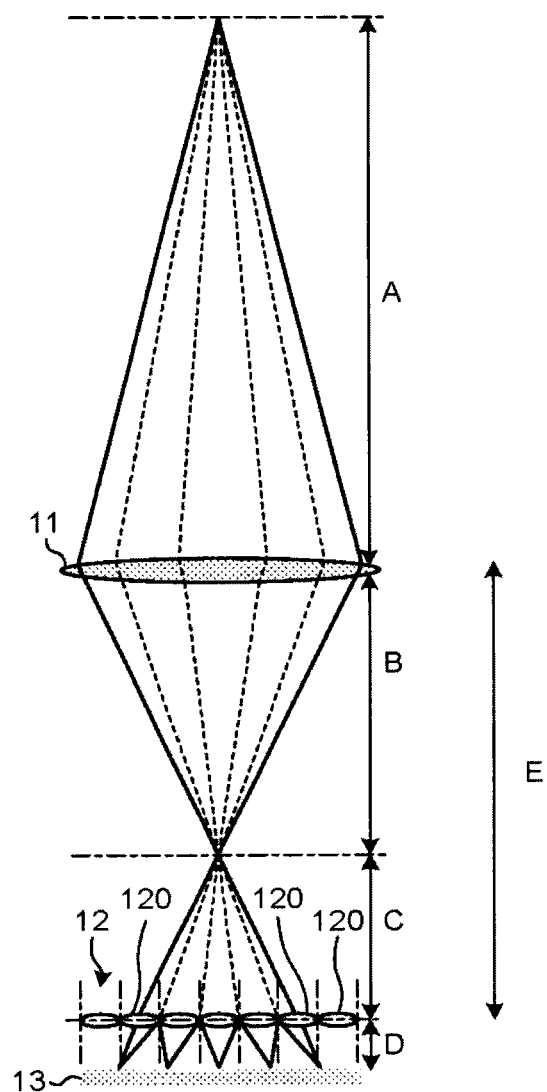
FIG. 2 is a diagram illustrating an exemplary configuration of an optical system that can be implemented in the embodiment.

Optical system implementable in embodiment Given below is the explanation of an optical system that can be implemented in the embodiment. Herein, the optical system includes the main lens 11, the microlens array 12, and the image sensor 13. In FIG. 2 is illustrated an exemplary configuration of the optical system that can be implemented in the embodiment. With reference to FIG. 2, a distance A indicates the distance between the main lens 11 and a photographic subject; and a distance B indicates the image forming distance for the main lens 11. Moreover, a distance C indicates the shortest distance between the image forming surface of the main lens 11 and each microlens of the microlens array 12; and a distance D indicates the distance between the microlens array 12 and the image sensor 13. Meanwhile, the main lens 11 has a focal distance f, and each microlens 120 has a focal length g. Herein, for the purpose of illustration, with respect to the optical axis, the side of the photographic subject is defined as the front side and the side of the image sensor 13 is defined as the backside.

In the optical system, using the light beams coming from the main lens 11, the microlenses 120 disposed in the microlens array 12 form images of all viewpoints on the image sensor 13. Meanwhile, in the case of disposing color filters with respect to microlenses, a color filter for one color of the RGB colors is disposed with respect to each microlens 120. Moreover, in the case of disposing color filters on the sensor, for example, the color filters are arranged on a pixel-by-pixel basis according to the Bayer arrangement.

Figure 3:
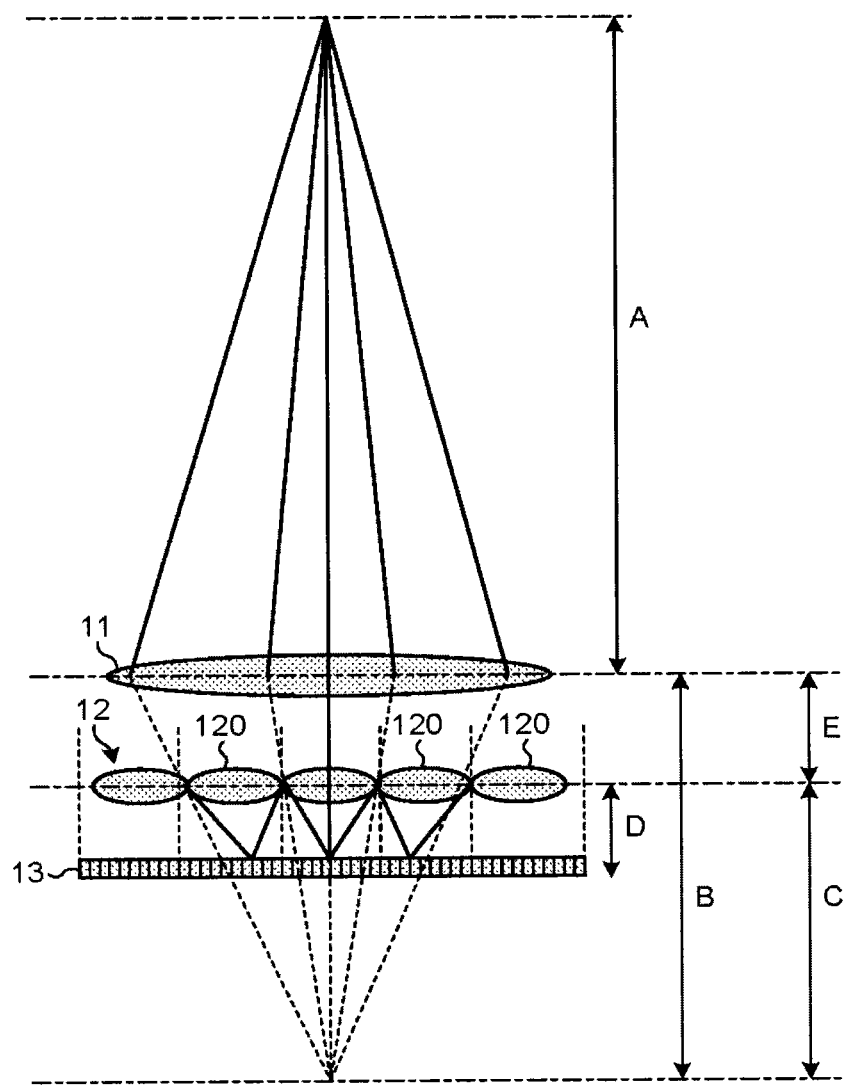
FIG. 3 is a diagram illustrating another exemplary configuration of the optical system that can be implemented in the embodiment.

In the example illustrated in FIG. 2, the microlens array 12 is disposed on the backside of the image forming surface of the main lens 11. However, that is not the only possible case. Alternatively, for example, as illustrated in FIG. 3, the microlens array 12 can be disposed on the front side of the image forming surface of the main lens 11. In the following explanation, unless otherwise specified, it is assumed that the microlens array 12 in the optical system is disposed on the backside of the image forming surface of the main lens 11.

Figure 4:
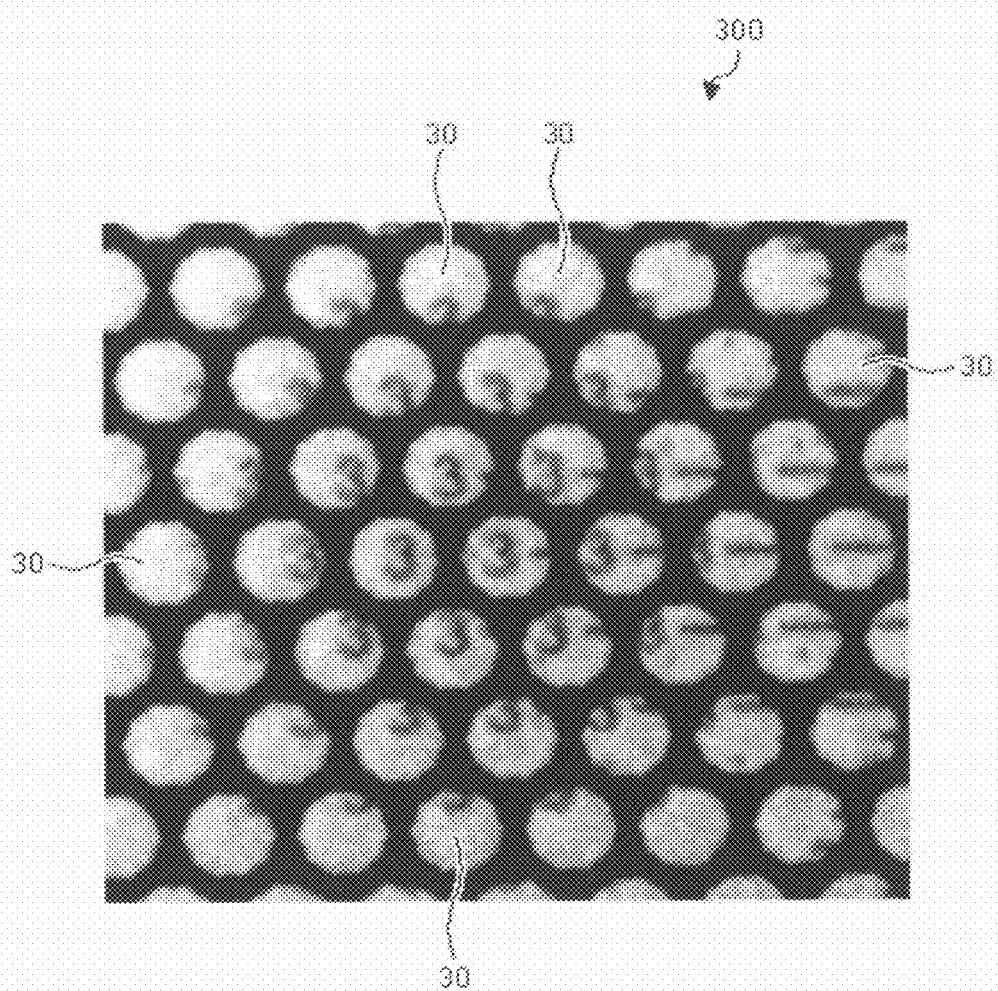
FIG. 4 is a diagram schematically illustrating an example of image data according to the embodiment.

In FIG. 4 is schematically illustrated an example of the image data based on the output of the image sensor 13 in the case in which the image forming surface of the main lens 11 is positioned on the backside of the image sensor 13 according to the embodiment. The signal processor 15 outputs, as image data of a RAW image, an image 300 in which microlens images 30, which are formed on the light receiving surface of the image sensor 13 due to the microlenses 120 of the microlens array 12, are arranged in a corresponding manner to the arrangement of the microlenses 120.

With reference to FIG. 4, according to the arrangement of the microlenses 120, the same photographic subject (for example, the number "3") is captured with a predetermined shift in each microlens image 30. In the following explanation, the shift of the same photographic subject in each microlens image 30 is called "image shift", and the predetermined amount of shift in each microlens image 30 is called "amount of image shift".

Herein, it is desirable that the microlens images 30 formed on the image sensor 13 due to the microlenses 120 are formed without any mutual overlapping. Moreover, with reference to FIG. 4, the arrangement represents a hexagonal array in which the microlenses 120 are arranged on hexagonal lattice points in the microlens array 12. However, the arrangement of the microlenses 120 is not limited to this example, and it is possible to have some other arrangement. For example, the microlenses 120 can be arranged on square lattice points.

Explained below with reference to FIG. 2 is the principle of creating a refocused image. With reference to FIG. 2, addition of the distance B and the distance C is treated as a distance E. If the position of the main lens 11 is fixed, then the distance E is a constant number. Herein, the explanation is given under the assumption that the distance E and the distance D are constant numbers.

In the main lens 11, a relationship given below in Equation (1) according to the lens formula is established between the distance A to the photographic subject, the distance B at which an image is formed by the light coming from the photographic subject, and the focal distance f. In an identical manner, regarding the microlenses 120 of the microlens array 12 too, a relationship given below in Equation (2) according to the lens formula is established.

$$\frac{1}{A} + \frac{1}{B} = \frac{1}{f} \quad (1)$$

$$\frac{1}{C} + \frac{1}{D} = \frac{1}{g} \quad (2)$$

When there is a change in the distance A between the main lens 11 and the photographic subject, the value of the distance B in the lens formula given in Equation (1) undergoes a change. Based on the positional relationship in the optical system, addition of the distance B and the distance C is equal to the distance E as described above. Moreover, the distance E is fixed. Hence, along with the change in the distance B, the value of the distance C also undergoes a change. Regarding the microlenses 120, as a result of using the lens formula given in Equation (2), along with the change in the distance C, it is found that the value of the distance D also undergoes a change.

Hence, as far as the image formed due to each microlens 120 is concerned, it becomes possible to obtain an image that is the result of reducing the image forming surface, which is a virtual image of the main lens 11, to a magnification N where N=D/C. The magnification N can be expressed as Equation (3) given below.

$$N = \frac{D}{C} = \frac{D}{E-B} = \frac{\frac{Cg}{C-g}}{E - \frac{Af}{A-f}} = \frac{Cg(A-f)}{(C-g)\{E(A-f) - Af\}} \quad (3)$$

According to Equation (3), it is found that the reduction ratio of the images formed on the image sensor 13 due to the microlenses 120 is dependent on the distance A from the main lens 11 to the photographic subject. Hence, in order to reconstruct the original two-dimensional image; for example, the microlens images 30 that are formed due to the microlenses 120 are enlarged with the magnification of 1/N, thereby resulting in the generation of enlarged microlens images. Then, superimposition and synthesizing of the enlarged microlens images is performed so that it becomes possible to obtain a reconstructed image that is in focus with the distance A.

During superimposition, regarding the portion at distances other than the distance A, the enlarged microlens images get superimposed in a misaligned manner. As a result, it becomes possible to achieve a blurring-like effect. Thus, the refocussing process points to a process in which an arbitrary position is brought into focus from such microlens images.

Given below is the explanation about the distance calculation method. As already described with reference to Equation (3), when there is a change in the value of the distance A illustrated in FIG. 2, the values of the distances B, C, and D also undergo a change. Consequently, the reduction ratio N of the microlens images also undergoes a change.

If Equation (3) is organized for the distance A, then Equation (4) given below is obtained. From Equation (4), the reduction ratio N of the images formed by the microlenses 120 is calculated by means of image matching. Moreover, if the distances D and E and the focal distance f are known, then the value of the distance A can be calculated from Equation (4).

$$A = \frac{(D-NE)f}{D-NE+Nf} \quad (4)$$

In the case of the optical system illustrated in FIG. 3, addition of the distance E and the distance C is equal to the distance B. Moreover, the lens formula related to the microlenses 120 is given below in Equation (5). In this case, the relation between the distance A and the reduction ratio N can be expressed using Equation (6) given below.

$$-\frac{1}{C}+\frac{1}{D}=\frac{1}{g} \quad (5)$$

$$A = \frac{(D+NE)f}{D+NE-Nf} \quad (6)$$

If Δ' represents the amount of shift of the microlens images 30 between the microlenses 120 and if a value L represents the center distance between the microlenses 120, then the reduction ratio N can be expressed using Equation (7) according to the geometric relationship of light beams. Thus, in order to obtain the reduction ratio N, the image processor 23 can implement an evaluation function such as the sum of absolute difference (SAD) or the sum of squared difference (SSD), perform image matching with respect to each microlens image 30, and obtain the amount of shift Δ' between the microlenses 120.

$$N = \frac{\Delta'}{L} \quad (7)$$

Meanwhile, in the case of using a color filter array in the image sensor 13, the image processor 23 can perform image matching among the microlens images 30 formed due to the color filters of same colors.

Figure 5:
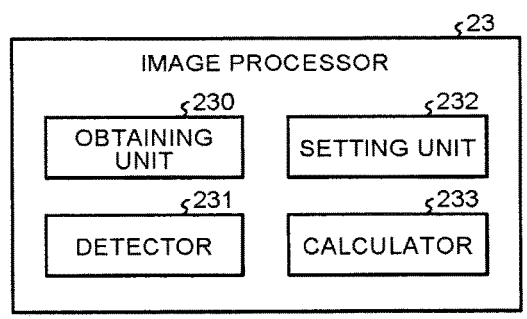
FIG. 5 is an exemplary functional block diagram for explaining the functions of an image processor according to the embodiment.

FIG. 5 is an exemplary functional block diagram for explaining the functions of the image processor 23. With reference to FIG. 5, the image processor 23 includes an obtaining unit 230, a detector 231, a setting unit 232, and a calculator 233. Herein, the obtaining unit 230, the detector 231, the setting unit 232, and the calculator 233 can be implemented as functions on a single hardware unit or can be implemented as a plurality of hardware units operating in coprocess with each other. Alternatively, the obtaining unit 230, the detector 231, the setting unit 232, and the calculator 233 can be implemented as computer programs that run in a central processing unit (CPU).

The obtaining unit 230 obtains, from the memory 22, electrical-charge-based image data read from the image sensor 13. The setting unit 232 selects, in the image formed due to the image data obtained by the obtaining unit 230, the microlens image of interest from among the microlens images 30 formed due to the microlenses 120. Then, according to the image height of the microlens image of interest, the setting unit 232 sets the arrangement of the microlens image of interest and a plurality of comparison-target microlens images from among the microlens images 30.

Herein, the image height is equivalent to the distance from the optical axis position of the main lens 11 on the imaging surface of the image sensor 13. In the case in which the optical axis of the main lens 11 is coincident with the center of the image captured by the image sensor 13, the image height is equivalent to the distance from the center of the captured image. Thus, closer the optical axis of the main lens 11 to the center of the captured image, the smaller is the image height. On the other hand, farther the optical axis of the main lens 11 from the center of the captured image, the greater is the image height.

The detector 231 performs image matching so as to compare the microlens image of interest, which is set by the setting unit 232, with a plurality of comparison-target microlens images; and detects the amount of image shift between the microlens image of interest and each comparison-target microlens image. Based on the amounts of image shift detected by the detector 231, the calculator 233 calculates the distance corresponding to the microlens image of interest. Herein, the calculator 233 calculates the distance corresponding to each microlens 120 treated as the microlens image of interest, and thus can create a distance map that indicates the distances of the on-image positions corresponding to the microlenses 120.

Meanwhile, an image processing program, which is executed to enable image processing in the image processor 23 according to the embodiment, is recorded as an installable or executable file in a computer-readable recording medium such as a compact disk (CD) or a digital versatile disk (DVD). However, that is not the only possible case. Alternatively, the image processing program, which is executed to enable image processing according to the embodiment, can be stored in advance in a read only memory (ROM) installed in the imaging device 1.

Still alternatively, the image processing program, which is executed to enable image processing according to the embodiment, can be saved as a downloadable file on a computer connected to a communication network such as the Internet or can be made available for distribution through a communication network such as the Internet.

The image processing program, which is executed to enable image processing according to the embodiment, contains a module for each of the abovementioned constituent elements (i.e., the obtaining unit 230, the detector 231, the setting unit 232, and the calculator 233). As the actual hardware, a CPU reads the image processing program from a storage, such as a hard disk drive or a nonvolatile memory, and runs it such that the abovementioned constituent elements are loaded in a main memory device (such as a random access memory (RAM)). As a result, each of the abovementioned constituent elements is generated in the main memory device.

Meanwhile, regarding image processing hardware used to perform image processing according to the embodiment, the image processing method can be implemented in a chip, such as a field-programmable gate array (FPGA) or an application specific integrated circuit (ASIC), or in an analog circuit.

Details of Processes According to the Embodiment Image Shift Detection

While performing image matching for detecting an amount of image shift, depending on the settings of the optical system and the distance to the photographic subject, there may be a case in which not only the microlens image positioned adjacent to the microlens image of interest, for which the distance calculation is to be done, is treated as a comparison-target microlens image, but also the microlens image positioned adjacent to the abovementioned comparison-target microlens image is also treated as a comparison-target microlens image. That is, there are times when the image included in the microlens image of interest is not only included in a shifted manner in the image in a first comparison-target microlens image that is adjacent to the microlens image of interest, but also included in a further shifted manner in the image in a second comparison-target microlens image that is adjacent to the first comparison-target microlens image.

In the embodiment, assuming that the comparison-target microlens images are sequentially adjacent to the microlens image of interest, levels are defined with respect to the comparison-target microlens images according to the respective distances from the microlens image of interest.

Figure 6:
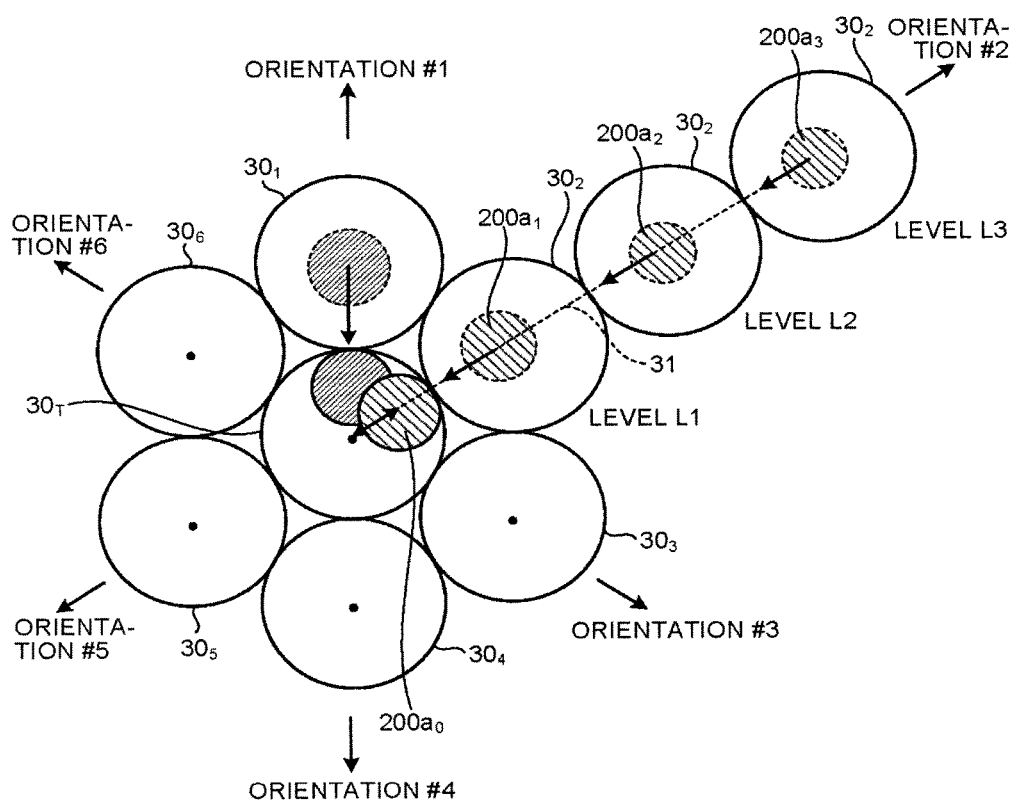
FIG. 6 is a diagram for explaining about defining levels for comparison-target microlens images according to the embodiment.

The relevant explanation is given with reference to FIG. 6. As illustrated in FIG. 6, due to the microlenses 120 arranged on hexagonal lattice points, microlens images $30_1$, $30_2$, and so on are also formed on hexagonal lattice points. In this case, with respect to a microlens image $30_T$ of interest, six microlens images $30_1$ to $30_6$ are adjacent respectively in six orientations #1 to #6 that differ by angles of 60°.

With reference to FIG. 6, taking the orientation #2 as an example, on a line 31 directed in the orientation #2 from the center of the microlens image $30_T$ of interest, the microlens images $30_2$ are formed in a sequentially adjacent manner. In this case, the microlens image $30_2$ that is adjacent to the microlens image $30_T$ of interest is defined to be at a level L1; while the microlens image $30_2$ formed adjacent to the microlens image $30_2$ at the level 1 but in the direction away from the microlens image $30_T$ of interest is defined to be at a level L2. In an identical manner, the microlens image $30_2$ formed adjacent to the microlens image $30_2$ at the level L2 but in the direction away from the microlens image $30_T$ of interest is defined to be at a level L3. In an identical manner, levels L4, L5, and so on can also be defined.

Herein, the explanation of the processes performed according to the embodiment is given under the assumption that the image included in the microlens image $30_2$ of interest is included till the microlens image $30_2$. Thus, with reference to FIG. 6, the microlens images $30_1$, $30_2$, and so on excluding the microlens image $30_2$ of interest serve as the comparison-target microlens images for performing comparison with the microlens image $30_2$ of interest.

Herein, consider about the microlens 120 corresponding to the microlens image $30_2$ of interest (called a first microlens) and consider about the microlens 120 corresponding to the microlens image $30_2$ that is adjacent to the microlens image $30_2$ of interest in the orientation #2 (called a second microlens). In this case, regarding a photographic subject that appears in common in the first and second microlenses; in the projection plane onto which the photographic subject is projected, that is, in the microlens image $30_2$ of interest and the comparison-target microlens image $30_2$, the image of the photographic subject falls on an epipolar line based on an epipolar plane formed due to the position of the photographic subject and the center points of the first and second microlenses. Accordingly, due to the epipolar constraint, the image of the photographic subject undergoes an image shift on the epipolar line in the comparison-target microlens image $30_2$.

This phenomenon occurs in the same way in the other comparison-target microlens images $30_1$, $30_3$, $30_4$, $30_5$, and $30_6$ with respect to the microlens image $30_2$ of interest. Thus, regarding the image that appears in common in the microlens image of interest and the comparison-target microlens images, the image shift in the comparison-target microlens images occurs on the epipolar line, that is, on the line joining the center of the microlens image of interest and the centers of the comparison-target microlens images.

For example, with reference to FIG. 6, the line 31 that joins the center of the microlens image $30_T$ of interest and the centers the comparison-target microlens images $30_2$, which are formed in a sequentially adjacent manner with respect to the microlens image $30_T$ of interest in the orientation #2, becomes parallel to the epipolar line.

Meanwhile, herein, the explanation is given under the assumption that the microlens images $30_1$, $30_2$, and so on are formed on hexagonal lattice points. However, that is not the only possible example. Alternatively, for example, the microlens images $30_1$, $30_2$, and so on can be formed on square lattice points.

Firstly, the setting unit 232 of the image processor 23 sets, in the microlens image $30_T$ of interest, a template area $200a_0$ that serves as the basis for comparison with the comparison-target microlens images $30_2$. Then, for example, in the comparison-target microlens images $30_2$ at the levels L1 to L3 in the orientation #2, the setting unit 232 sets matching areas $200a_1$, $200a_2$, and $200a_3$, respectively, for the purpose of calculating the degrees of similarity with the template area $200a_0$. Since the image shift occurs in the direction along the epipolar line, the matching areas $200a_1$, $200a_2$, and $200a_3$ lie on the line 31 that joins the central coordinates of the comparison-target microlens images $30_2$.

For example, the detector 231 shifts the matching area $200a_1$ on the line 31, which is parallel to the epipolar line, and obtains the degrees of similarity between the template area $200a_0$ and the matching area $200a_1$ at a plurality of predetermined positions by means of image matching. Of the degrees of similarity obtained at a plurality of positions, the detector 231 detects, as the position of image shift, the position exhibiting the highest degree of similarity. The calculator 233 refers to the amounts of image shift obtained by the detector 231 and refers to the inter-microlens distances between the microlens image $30_T$ of interest and the comparison-target microlens images $30_2$ for which the amounts of image shift are obtained, and can obtain the reduction ratio N according to Equation (7) given earlier.

The microlens image $30_T$ of interest is surrounded by a plurality of comparison-target microlens images $30_1$ to $30_6$. In FIG. 6, for the purpose of illustration, three comparison-target microlens images $30_2$ up to the level L3 are illustrated only in the orientation #2. However, in practice, in all of the orientations #1 to #6, three comparison-target microlens images $30_1$ to $30_6$, respectively, are present up to the level L3. That is, with respect to the microlens image $30_T$ of interest, 18 comparison-target microlens images are present.

For that reason, if the results of image matching for a plurality of comparison-target microlens images are averaged, it becomes possible to statistically improve the matching accuracy of the amount of image shift. Herein, if $\Delta_i'$ represents the amount of image shift in the comparison-target microlens images around the microlens image $30_T$ of interest, if L represents the center distance between the surrounding microlenses, and if M represents the number of comparison-target microlens images to be averaged; then the reduction ratio N of the image is expressed using Equation (8) given below. The calculator 233 can calculate the reduction ratio N according to Equation (8), and can obtain the amount of shift with a higher degree of accuracy. That leads to an enhancement in the accuracy of distance calculation.

$$N = \frac{\sum_{i=1}^{M} \frac{\Delta'_i}{L_i}}{M} \quad (8)$$

Meanwhile, while performing image matching, if an area that is low on texture is set as the template area $200a_0$, then there is only a small variation in the evaluation value of SAD. That leads to vulnerability against the noise of the image sensor, thereby possibly lowering the reliability of the obtained result. For that reason, while performing image matching, it is desirable that the setting unit 232 determines the texture quantity of the template area $200a_0$.

For example, the setting unit 232 performs threshold value determination against the texture quantity of the template area $200a_0$. If the texture quantity is equal to or smaller than the threshold value, then the setting unit 232 shifts the template area $200a_0$ within the microlens image $30_T$ of interest. Alternatively, for example, if the texture quantity is equal to or smaller than the threshold value, then the setting unit 232 may not perform the search along the concerned direction of the comparison-target microlens images (in the example illustrated in FIG. 6, along the orientation #2).

As the indicator of the texture quantity of the template area $200a_0$, it is possible to use, for example, the variance of the luminance values in the template area $200a_0$. In this case, for example, if the variance is equal to or greater than a threshold value, then the setting unit 232 determines that image matching can be performed using the template area $200a_0$. As a result of using the texture quantity of the template area $200a_0$ for determining whether or not image matching can be performed, it becomes possible to maintain a high degree of accuracy in the detection of the amount of image shift.

Alternatively, the setting unit 232 can make use of individual information of the microlenses 120 for determining whether or not image matching can be performed. For example, from among the microlenses 120, the setting unit 232 can detect the microlenses 120 that are rendered unserviceable due to manufacturing defects or due to the presence of foreign particles; and may not use, during image matching, the microlens images 30 formed due to the unserviceable microlenses 120.

The individual information of the microlenses 120 contains, for example, availability of the microlenses and information indicating the focal distance. Moreover, for example, as the information about the microlens array 12, an inter-microlens distance $L_i$ is also included. The image processor 23 can refer to the individual information of the microlenses 120 and the information about the microlens array 12, and can calculate the distance A between each microlens 120 and the photographic subject with a higher degree of accuracy according to Equation (7) and Equation (6) given earlier.

Processes According to Image Height

Figure 7:
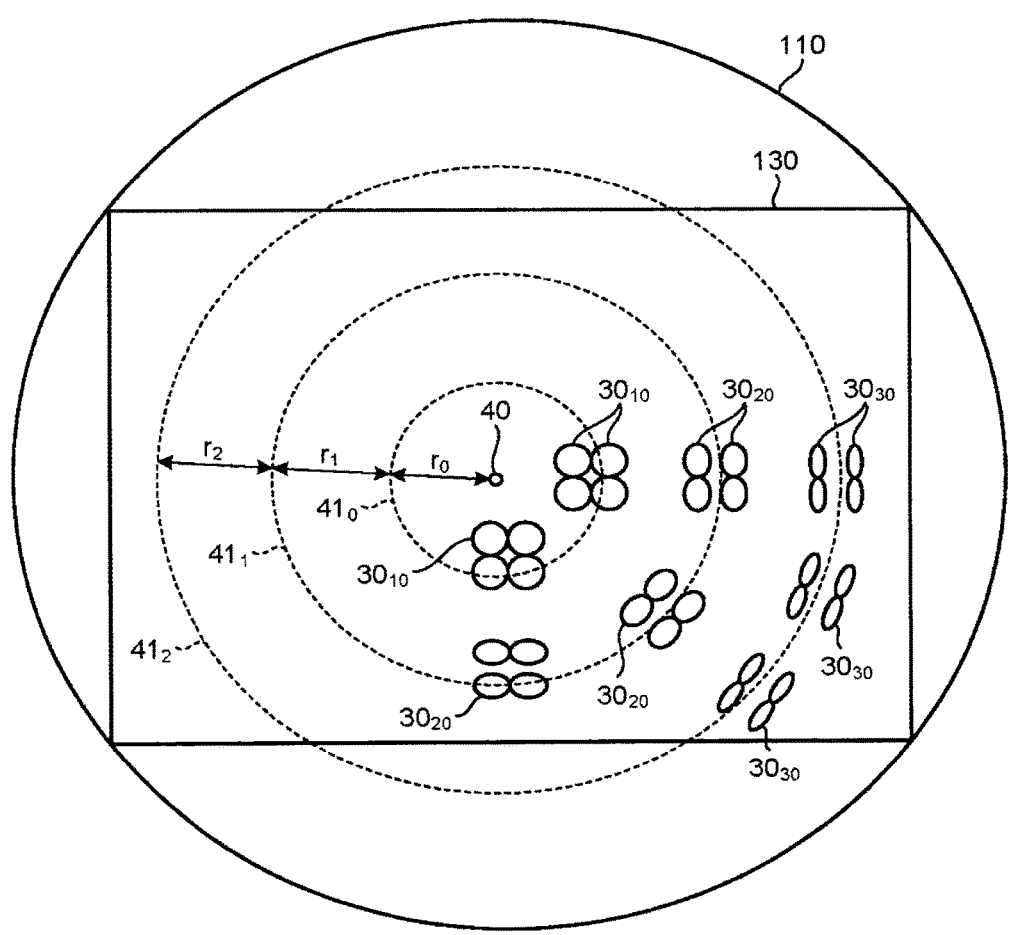
FIG. 7 is a diagram schematically illustrating a condition in which microlens images undergo deformation according to the image height.

Regarding the microlens images 30, greater the image height, the larger is the deformation in the microlens images 30. In FIG. 7 is schematically illustrated a condition in which the microlens images 30 undergo deformation according to the image height. In an image circle 110 formed due to the main lens 11, an imaging surface 130 of the image sensor 13 is included. On a circumference $41_0$ having a radius $r_0$ from a center 40 of the main lens 11, microlens images $30_{10}$ are formed in a substantially round shape. In contrast, on a circumference $41_1$ having a radius $r_0+r_1$ from the center 40 and having a greater image height, microlens images $30_{20}$ are formed that are deformed into elliptical shape as a result of shrinking in the radial direction of the circumference $41_1$ and having the circumferential direction of the circumference $41_1$ as the long axis direction. Moreover, on a circumference $41_2$ having a radius $r_0+r_1+r_2$ from the center 40 and having a still greater image height, microlens images $30_{30}$ are formed that are deformed into a flatter shape which can be approximated to an elliptical shape as a result of further shrinking in the radial direction of the circumference $41_2$ as compared to the microlens images $30_{20}$.

In this way, when there is occurrence of vignetting attributed to the aperture; greater the image height, the flatter is the shape of the microlens images as a result of deformation. Thus, for example, if an area having a smaller image height has a round matching area and if the same matching area is also set in an area having a greater image height; then there can be a situation in which, for example, the matching area goes beyond the microlens images. In such a case, during image matching, the edges of the deformed microlens images are detected in the matching area. That is, the area not present in the microlens images gets falsely detected.

As described above, the deformation of a microlens image occurs according to the distance from the optical axis position of the main lens 11. Hence, in the area in which the degree of deformation of the microlens images is high, it is more desirable that image matching is performed between the microlens images that are positioned along the circumferential direction centered at the optical axis of the main lens 11.

Figure 8A:
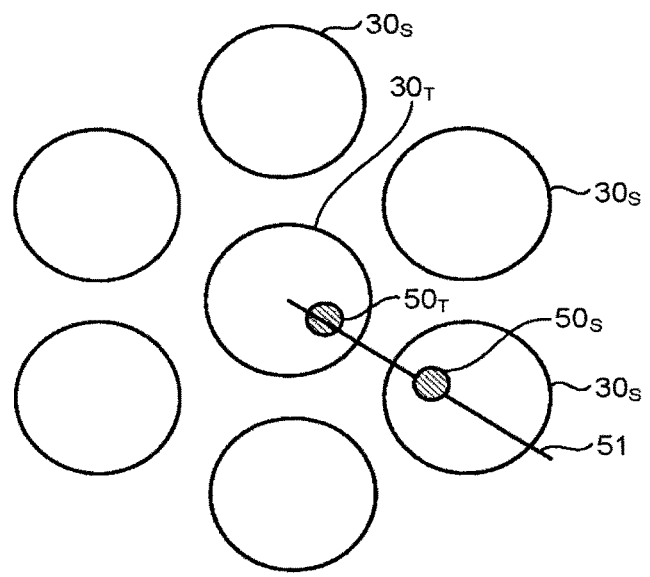
FIGS. 8A and 8B illustrate examples in which the search ranges for microlens images are set to be different according to the image height according to the embodiment.
Figure 8B:
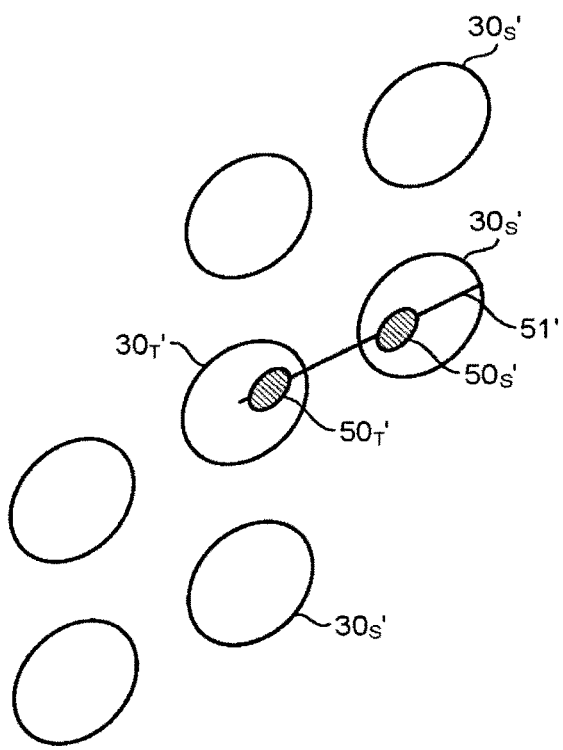

FIGS. 8A and 8B illustrate examples in which the search ranges for microlens images are set to be different in the area having a smaller image height than in the area having a greater image height. In FIG. 8A are illustrated the microlens image $30_T$ of interest and comparison-target microlens images $30_S$ in the area in which the image height is equal to or smaller than a predetermined value. In the area having a smaller image height, the shape of each microlens image can be approximated to the same shape as the main lens aperture. Hence, when the main lens aperture is round in shape, the microlens image $30_T$ of interest and the comparison-target microlens images $30_S$ are set to be round in shape.

Moreover, in the area having a smaller image height, the arrangement of the microlens image $30_T$ of interest and the comparison-target microlens images $30_S$ is such that the microlens images positioned in a hexagonal manner around the microlens image $30_T$ of interest are used as the comparison-target microlens images $30_S$. Regarding a template area $50_T$ and a matching area $50_S$ in this example, both the areas are set to be round in shape according to the shape of the microlens images and are set on a line 51 that is parallel to the epipolar line.

In FIG. 8B are illustrated a microlens image $30_T'$ of interest and comparison-target microlens images $30_S'$ in the area in which the image height is equal to or greater than a predetermined value.

As the image height goes on increasing, the degree of deformation of each microlens image also increases. Hence, it is not desirable that the microlens images which are positioned with respect to the microlens image $30_T'$ in the radial direction of the circle centered at the optical axis of the main lens 11 are selected as the comparison-target microlens images to be used for comparison during image matching.

For that reason, in the embodiment, in the area having a greater image height, the microlens images positioned in the circumferential direction centered at the optical axis of the main lens 11 are used as the comparison-target microlens image $30_S'$. In the example illustrated in FIG. 8B, of the six microlens images positioned around the microlens image $30_T'$ of interest, excluding the two microlens images that are positioned with respect to the microlens image $30_T'$ of interest in the radial direction of the circle centered at the optical axis of the main lens 11, the four microlens images are selected as the comparison-target microlens images $30_S'$. Besides, the two microlens images positioned adjacent to the microlens image $30_T'$ of interest on the circumference are also selected as the comparison-target microlens images $30_S'$.

In this way, in the embodiment, the arrangement of the comparison-target microlens images with respect to the microlens image of interest is set according to the image height. Therefore, in the area having a greater image height too, it becomes possible to perform image matching with a high degree of accuracy.

Moreover, in the area having a greater image height, the shape of the microlens images becomes a flatter shape that can be approximated to an elliptical shape in the direction of increase in the image height, that is, in the radial direction of the circle centered at the optical axis of the main lens 11. For that reason, if the microlens image $30_T'$ of interest and the comparison-target microlens images $30_S'$ are set to be round in shape identical to the area having a smaller image height; then, during image matching, it is likely that an area, such as the edges of the microlens images, not present in the microlens images gets detected.

Hence, in the embodiment, in the area having a greater image height, the shape of the microlens image $30_T'$ of interest and the comparison-target microlens images $30_S'$ is deformed to be approximately elliptical in shape according to the image height as illustrated in FIG. 8B. Moreover, the template area and the matching area are also deformed according to the image height. For that reason, in the area having a greater image height, the template area $50_T'$ in the microlens image $30_T'$ and a matching area 50S', which is present in the comparison-target microlens image $30_S'$ and which lies on a line 51' parallel to the epipolar line in an identical manner to the template area $50_T'$, are deformed to be approximately elliptical in shape according to the image height.

In this way, in the embodiment, the shape of the microlens image of interest and the comparison-target microlens images as well as the shape of the template area and the matching area is deformed according to the image height. As a result, during image matching performed in the area having a greater image height, an area not present in the microlens images is prevented from getting detected.

Given below is the concrete explanation about the method of setting different search ranges for microlens images. Firstly, the explanation is given about a first method, in which search ranges according to the image heights are stored in advance in the form of coordinate information. The detector 231 performs image matching using the coordinate information as mask data, and detects the amounts of image shift.

Figure 9:
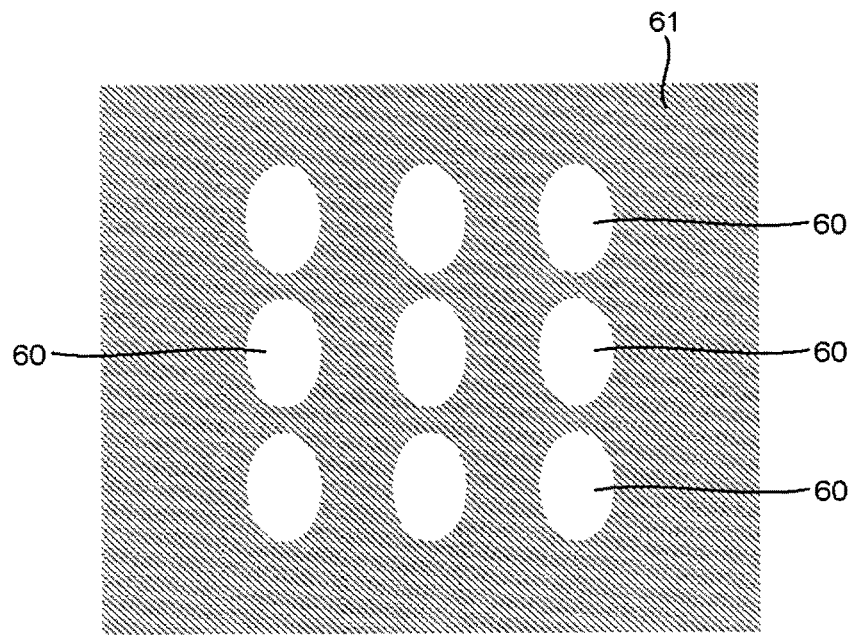
FIG. 9 is a diagram illustrating an example of mask data according to the embodiment.

In FIG. 9 is illustrated an example of the mask data. Herein, the mask data contains identification information that enables determination of areas 60 inside the microlens images and an area 61 outside the microlens images. The identification information is, for example, associated with coordinate information of the image data formed due to the imaging surface 130. The detector 231 refers to the identification information and performs image matching only within the areas 60 inside the microlens images.

More particularly, the setting unit 232 refers to the coordinate information and sets a template area to be present within the areas 60 inside the microlens images. Then, while performing image matching, the detector 231 determines, based on the identification information, whether or not a matching area is included in the areas 60 inside the microlens images. If a matching area includes the area 61 present outside the microlens images, then the detector 231 does not perform image matching using that matching area. In this way, the detector 231 searches for matching areas that do not include the area 61 which is present outside the microlens images, and outputs the area having the highest degree of similarity as the image shift position.

Figure 10:
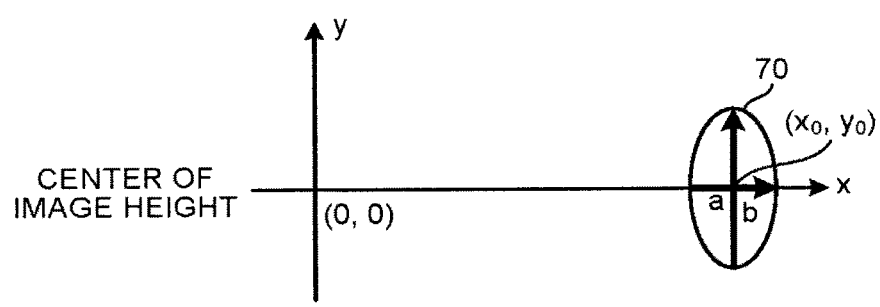
FIG. 10 is a diagram for explaining a second method for setting different search ranges for microlens images according to the embodiment.

Explained below is a second method for setting different search ranges for microlens images. In the second method, the microlens images and the matching areas are specified upon approximating them to be elliptical in shape. As illustrated in FIG. 10, the center of image height represents the origin (0, 0); the central direction of a microlens lens corresponding to the center of image height (0, 0) represents the x axis; and the direction perpendicular to the x axis represents the y axis. If $(x_0, y_0)$ represents the coordinates of the center of the microlens image and if the microlens image can be approximated to be an ellipse 70, then the microlens image is expressed using Equation (9) given below.

$$\left(\frac{x-x_0}{a}\right)^2 + \left(\frac{y-y_0}{b}\right)^2 \leq R^2 \quad (9)$$

Since the microlens image undergoes deformation in the x-axis direction, the value of a length "a" of the short side is dependent on the image height, that is, dependent on the coordinate $x_0$ as given below in Equation (10). The length "a" of the short side in Equation (9) given earlier is replaced with a variable dependent on the image height using the relation given below in Equation (10).

$$a \propto x_0^2 + y_0^2 \quad (10)$$

As far as the search range and the deformation of the template area are concerned, Equation (9) is applied for each microlens image. On the other hand, as far as the matching area is concerned, image matching is performed by storing the shape of the template area. Regarding the length "a" of the short side, a length "b" of the long side, and a constant number R; initial values are set in advance. Then, depending on the image height, the initial values are referred to by the imaging device 1 or in the image processing program, and the search range and the matching area are calculated.

Figure 11A:
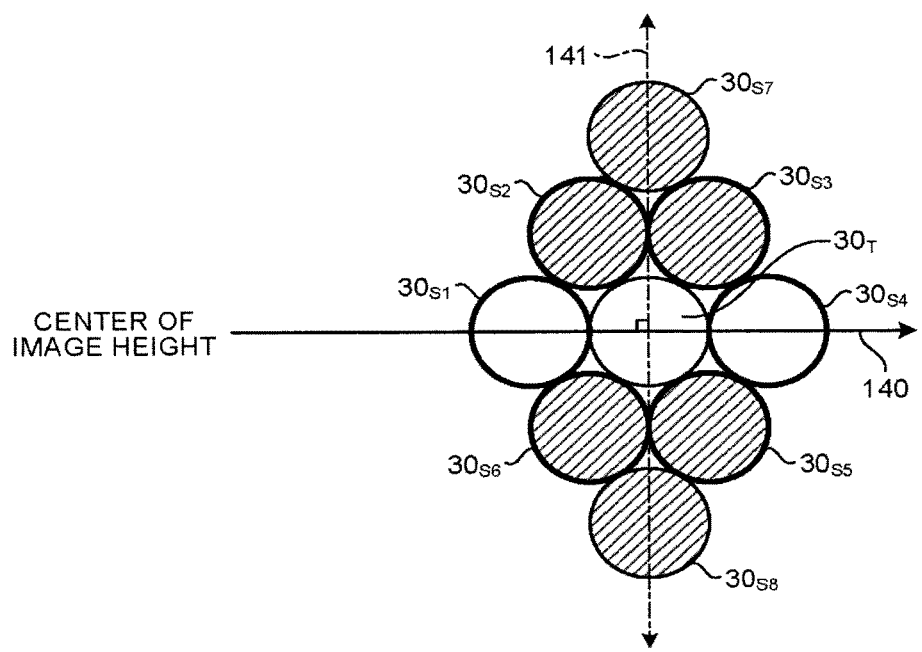
FIGS. 11A and 11B illustrate examples of the arrangement of the microlens image of interest and the comparison-target microlens images according to the image height according to the embodiment.
Figure 11B:
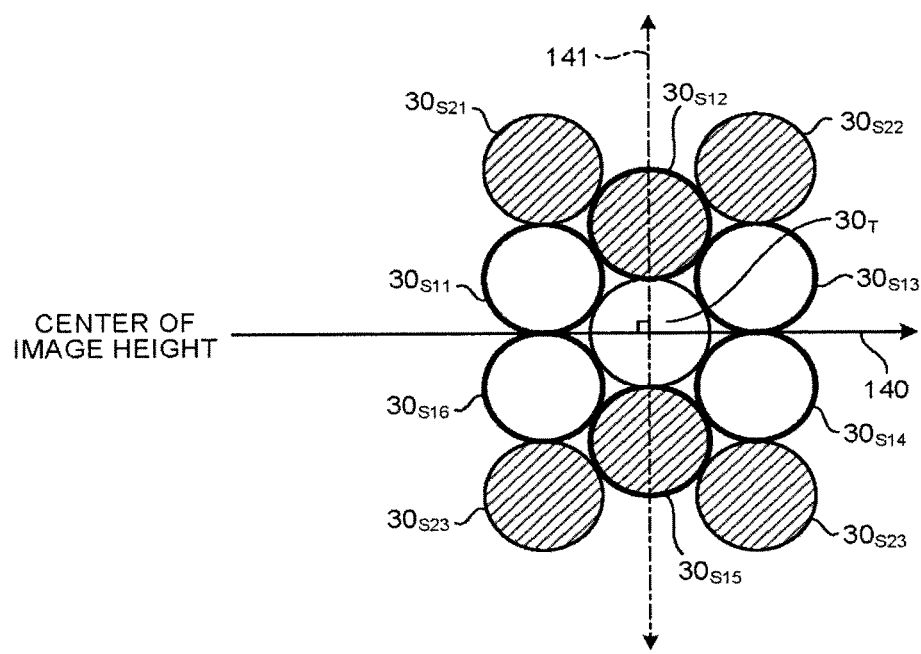

Explained below with reference to FIGS. 11A and 11B is the setting done for the arrangement of the microlens image of interest and the comparison-target microlens images according to the image height. In FIGS. 11A and 11B are illustrated a line 140 that is drawn in the radial direction of a circle centered at the center of image height, and a line 141 that is orthogonal to the line 140. Thus, the line 141 schematically illustrates the circumference of the circle centered at the center of image height at the point of intersection between the line 140 and the circle.

With reference to FIG. 11A, the arrangement of six comparison-target microlens images $30_{S1}$ to $30_{S6}$ (illustrated with heavy lines) in a hexagonal manner around the microlens image $30_T$ of interest is treated as a first arrangement. In the first arrangement, the hexagonal orientations #1 to #6 around the microlens image $30_T$ of interest are used as search axes while performing image matching.

Moreover, the arrangement of the comparison-target microlens images $30_{S2}$, $30_{S3}$, $30_{S5}$, and $30_{S6}$ (illustrated with hatched lines), excluding the comparison-target microlens images $30_{S1}$ and $30_{S4}$ that are formed in the radial direction of the circle centered at the center of image height from among the hexagonal orientations around the microlens image $30_T$ of interest, and two comparison-target microlens images $30_{S7}$ and $30_{S8}$ (illustrated with hatched lines), which are concyclic with the microlens image $30_T$ of interest, is treated as a second arrangement. In the second arrangement, the concerned circumferential direction is used as a search axis.

In the embodiment, according to the image height of the microlens image $30_T$ of interest, selection is done between the first arrangement or the second arrangement. That is synonymous with selecting the search axis according to the image height of the microlens image $30_T$ of interest while performing image matching.

Thus, in the case in which the microlens images undergo deformation in the radial direction of the circle centered at the center of image height; in the area having a greater image height, the searchable range during image matching becomes narrower thereby making it difficult to perform image searching. Moreover, since the images get distorted in the radial direction of the circle centered at the center of image height, it is relatively difficult to maintain the reliability of the detected amounts of shift. In that regard, if switching between the first arrangement and the second arrangement is done according to the image height, it becomes possible to resolve such issues.

More particularly, for example, according to Equation (9) and Equation (10) given earlier, the setting unit 232 calculates the length "a" of the short side and the length "b" of the long side based on the position of the selected microlens image of interest. Then, according to the result of comparing the ratio between the lengths "a" and "b" with a threshold value, the setting unit 232 sets either the first arrangement or the second arrangement.

As an example, if the ratio (a/b) of the lengths "a" and "b" is within a predetermined range (for example, if 0.7<a/b<1.3 holds true), then the setting unit 232 selects the first arrangement assuming that the microlens images are round in shape. However, if 0.7 a/b holds true or if 1.3≤a/b holds true, then the setting unit 232 selects the second arrangement.

Meanwhile, in practice, it is believed that the microlens images do not undergo deformation in such a way that the radial direction of the circle centered at the center of image height serves as the long axis direction. In that case, the setting unit 232 can compare the ratio (a/b) with a first threshold value th (for example, th=0.7). Then, if a/b>th holds true, the setting unit 232 selects the first arrangement assuming that the microlens images are round in shape. However, if a/b≤th holds true, then the setting unit 232 selects the second arrangement.

Moreover, if the distortion of images is greater than the shape variation of images, then switching between the first arrangement and the second arrangement can be done according to the image height. Furthermore, the second arrangement is not limited to the arrangement illustrated in FIG. 11A. Alternatively, a suitable second arrangement is determined according to the position of the microlens image of interest.

In FIG. 11B is illustrated another example of the second arrangement. In the example illustrated in FIG. 11B, another example of the second arrangement includes two comparison-target microlens images $30_{S12}$ and $30_{S15}$, excluding four comparison-target microlens images $30_{S11}$, $30_{S13}$, $30_{S14}$, and $30_{S16}$ that are formed adjoining the radius of the circle centered at the center of image height and passing through the center of the microlens image $30_T$ of interest from among the hexagonal orientations around the microlens image $30_T$ of interest; includes a comparison-target microlens image $30_{S21}$ adjoining the comparison-target microlens image $30_{S12}$; includes a comparison-target microlens image $30_{S22}$ adjoining the comparison-target microlens image $30_{S15}$; and includes comparison-target microlens images $30_{S23}$ and $30_{S24}$.

Figure 12:
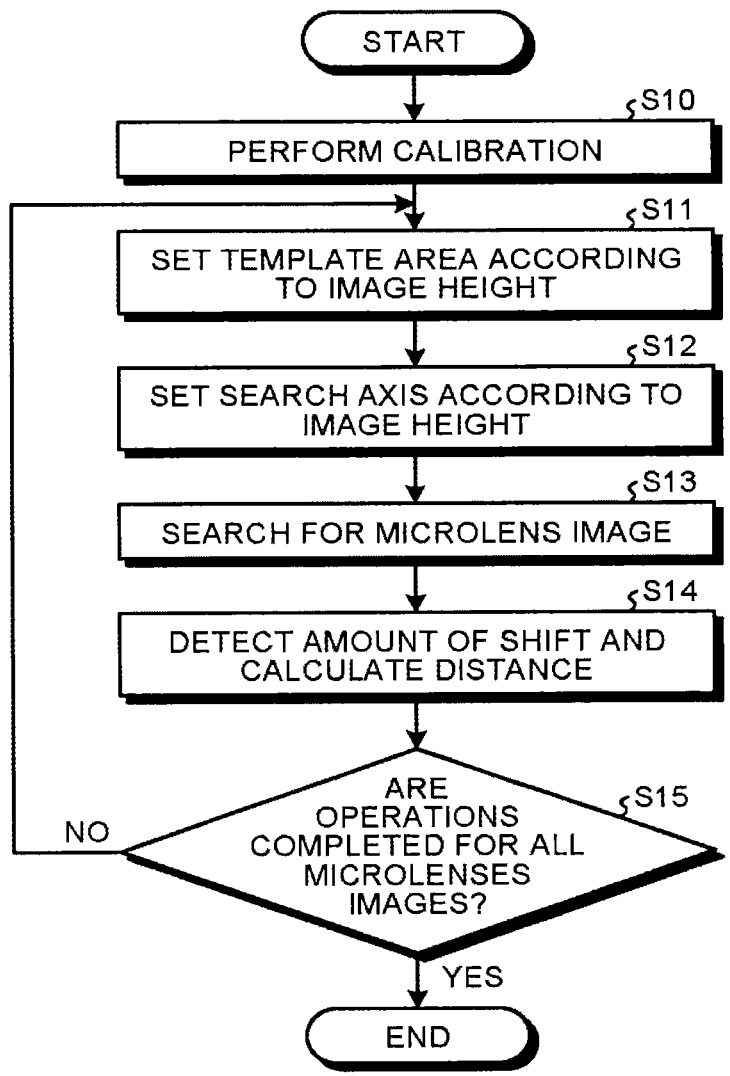
FIG. 12 is a flowchart for explaining an exemplary process for detecting the amounts of image shift according to the embodiment.

In FIG. 12 is illustrated a flowchart for explaining an exemplary process for detecting the amounts of image shift according to the embodiment. In the imaging device 1, various calibration processes are performed, and the constituent elements are set in a predetermined manner (Step S10). For example, as a result of the calibration processes, with respect to the microlens images, the setting unit 232 is provided with the coordinates, the inter-microlens distance, the coordinates of the center of image height, and various constant numbers for the calculation of Equation (9) and Equation (10) given earlier. Moreover, as a result of the calibration processes, the calculator 233 is provided with various constant numbers for the calculation of Equation (6) and Equation (7) given earlier. After the calibration processes are performed, the obtaining unit 230 obtains, from the memory 22, image data of an image captured by the image sensor 13.

Then, the setting unit 232 selects the microlens image of interest from among the microlens images included in the image corresponding to the image data. Depending on the image height of the selected microlens image of interest, the setting unit 232 sets the template area according to Equation (9) and Equation (10) given earlier (Step S11). Subsequently, according to the lengths "a" and "b" that are obtained according to the image height of the selected microlens image of interest and using Equation (9) and Equation (10), the setting unit 232 determines whether to implement the first arrangement or the second arrangement and sets the search axis to be used during image matching (Step S12).

Then, according to the template area and the search axis set by the setting unit 232 at Steps S11 and S12, the detector 231 searches for a comparison-target microlens image (Step S13). Subsequently, from the comparison-target microlens image retrieved at Step S13, the detector 231 obtains a matching area having a high degree of similarity with the template area and detects the amount of image shift. Moreover, based on the amount of image shift detected by the detector 231, the calculator 233 calculates the distance between the image in the microlens image of interest and the photographic subject using Equation (6) to Equation (8) given earlier (Step S14).

Figure 13:
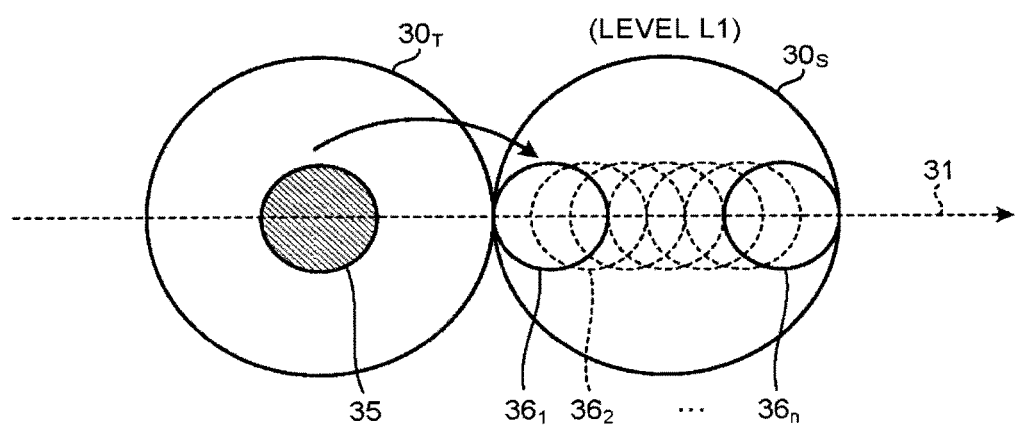
FIG. 13 is a diagram for explaining about searching for microlens images and detecting the amount of image shift according to the embodiment.

Given below with reference to FIG. 13 is the schematic explanation about the search performed at Step S13 and the detection of the amount of image shift done at Step S14. In FIG. 13 is schematically illustrated a situation in which the search is performed between the microlens image $30_T$ of interest and the comparison-target microlens image $30_S$ at the level L1.

With reference to FIG. 13, a template area 35 is set in the microlens image $30_T$ of interest; and a matching area $36_1$ is set at one end of the line 31, which is parallel to the epipolar line, in the comparison-target microlens image $30_S$. Then, the detector 231 performs image matching between the template area 35 and the matching area $36_1$ using an evaluation function such as SAD or SSD, and obtains the degree of similarity.

Then, in the comparison-target microlens image $30_S$, the setting unit 232 sets a matching area $36_2$ at a position shifted from the matching area $36_1$ by a predetermined distance on the line 31. Then, the detector 231 performs image matching between the template area 35 and the matching area $36_2$, and obtains the degree of similarity. The setting unit 232 and the detector 231 repeat these processes so that image matching is performed while every time shifting the matching area by a predetermined distance, and obtain the respective degrees of similarity.

When image matching is performed for a matching area $36_n$ that is set at the other end of the comparison-target microlens image $30_S$, the detector 231 obtains the amount of image shift based on the degrees of similarity obtained at the matching areas $36_1$, $36_2$, . . . , and $36_n$. Then, from the amount of image shift obtained by the detector 231, the calculator 233 calculates the distance between the image in the microlens image $30_T$ of interest and the photographic subject using Equation (6) to Equation (8) given earlier.

Meanwhile the process of searching for a comparison-target microlens image at Step S13 is performed to search for all comparison-target microlens images with respect to the microlens image of interest according to the search axis set at Step S12.

When the distance calculation at Step S14 is done for the selected microlens image of interest, the system control proceeds to Step S15. Then, it is determined whether the processes are completed for all microlens images (Step S15). If the processes are yet to be completed for any microlens image (No at Step S15), the system control returns to Step S11, and the next microlens image of interest is selected. Then, the processes from Steps S11 to S14 are performed for the selected microlens image of interest.

When it is determined that the processes are completed for all microlens images (Yes at Step S15), it marks the end of the sequence of processes illustrated in the flowchart in FIG. 12.

In this way, in the embodiment, while performing image matching among microlens images, deformation of the template area and determination of the search direction is performed. By performing those processes for all microlens images, it becomes possible to achieve enhancement in the calculated distance accuracy.

Modification Example of Embodiment

Figure 14:
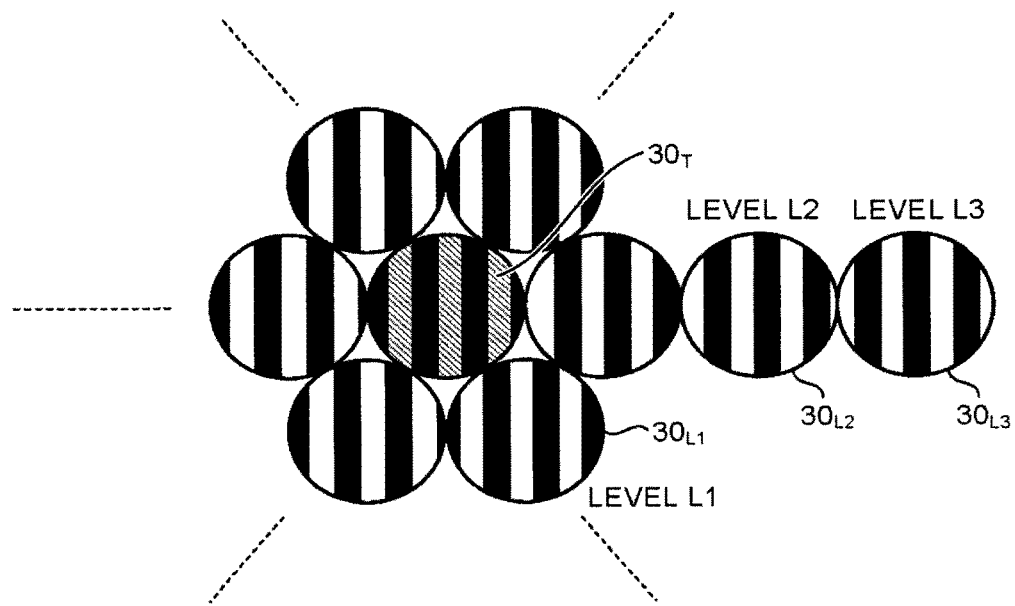
FIG. 14 is illustrated an example of microlens images in a case in which the photographic subject has a cyclic texture.

Given below is the explanation of a modification example of the embodiment. If the texture of the photographic subject is cyclic in nature, there are times when the correct matching position cannot be detected and an incorrect area gets detected. In FIG. 14 is illustrated an example of microlens images in the case in which the photographic subject has a cyclic texture. With reference to FIG. 14, it is assumed that the optical system illustrated in FIG. 3 is implemented. In the example illustrated in FIG. 14, the texture of the photographic subject is in the form of contrasty vertical stripes.

When comparison is done among a plurality of microlens images having different inter-microlens distances, that is, different baselines; the results of distance calculation differ from each other except at the correct matching position.

As an example, when L represents the inter-microlens distance and Δ' represents the amount of image shift between microlenses, consider a case in which the texture having gaps k is included in the microlens images as illustrated in FIG. 14. According to Equation (7) given earlier, in a comparison-target microlens image $30L_1$ formed at the level L1 with respect to the microlens image $30_T$ of interest, N=Δ'/L holds true. Regarding a comparison-target microlens image $30L_2$ formed at the level L2, the inter-microlens distance to the microlens image $30_T$ of interest is equal to a distance 2L. In an ideal condition, regarding the comparison-target microlens image at each level, the reduction ratio N can be treated as a constant number, and N=2Δ'/2L holds true according to Equation (7).

While on the other hand, the gaps k of the texture are constant in each microlens image. Hence, for example, the texture appearing at positions 0, k, 2k, and so on in the microlens image $30_T$ of interest appears at positions Δ', Δ'+k, Δ'+2k, and so on in the comparison-target microlens image $30_{L1}$ formed at the level L1. In an identical manner, the same texture appears at positions 2Δ', 2Δ'+k, 2Δ'+2k, and so on in the comparison-target microlens image $30_{L2}$ formed at the level L2.

For that reason, for example, the texture at the position k in the microlens image $30_T$ of interest is detected at the position Δ'+k in the comparison-target microlens image $30_{L1}$, and is detected at the position 2Δ'+k in the comparison-target microlens image $30_{L2}$. Therefore, a reduction ratio $N_1$ based on the detection result of the comparison-target microlens image $30_{L1}$ satisfies $N_1$=(Δ'+k)/L. Similarly, a reduction ratio $N_2$ based on the detection result of the comparison-target microlens image $30_{L2}$ satisfies $N_2$=(2Δ'+k)/2L. In this case, since the reduction ratio $N_1$ and the reduction ratio $N_2$ are not equal, an incorrect distance is calculated.

Figure 15:
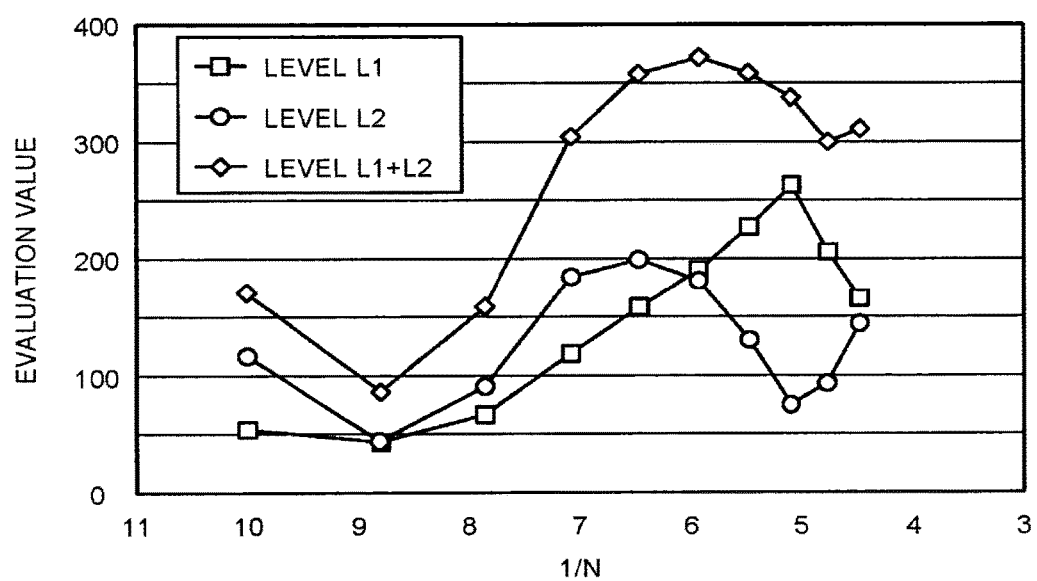
FIG. 15 is illustrated a result of adding the results of image matching according to a modification example of the embodiment.

In the modification example according to the embodiment, results of image matching for a plurality of comparison-target microlens images are added so as to prevent false detection with regards to the texture of cyclic nature. In FIG. 15 is illustrated a result of adding the results of image matching according to the modification example of the embodiment. In FIG. 15, the vertical axis represents evaluation values of results of image matching obtained using an evaluation function such as SAD or SSD; while the horizontal axis represents reciprocals of the reduction ratios. This corresponds to, for example, the manner in which the matching areas $36_1$, $36_2$, . . . , and $36_n$ are shifted in the comparison-target microlens image $30_S$ as explained with reference to FIG. 13. More particularly, FIG. 15 corresponds to the gaps of the matching areas $36_1$, $36_2$, . . . , and $36_n$.

In the example illustrated in FIG. 15, regarding the detection results at the level L1 (in FIG. 15, □: quadrilaterals), a dip point in the evaluation values can be recognized near 1/N=9. On the other hand, regarding the detection results at the level L2 (in FIG. 15, ○: circles), dip points in the evaluation values can be recognized near 1/N=9 and near 1/N=5. The comparison between the detection results at the level L1 and the detection results at the level L2 indicates that the evaluation value near 1/N=5 in the detection results at the level L1 is a high value, thereby indicating that the degree of similarity is low. Therefore, the dip point near 1/N=5 in the detection results at the level L2 can be assumed to be, for example, a false detection attributed to the texture of cyclic nature.

Referring to an addition result obtained by adding the detection results at the level L1 and the detection results at the level L2 (in FIG. 15, ◇: rhomboids), the dip point near 1/N=5 at the level L2 is cancelled out by the evaluation value at the level L1. Moreover, an explicit dip point can be seen near 1/N=9, at which the dip points are recognized in common at the levels L1 and L2. In this way, as a result of adding the results of image matching for the comparison-target microlens images, a robust result can be obtained with regards to the texture of cyclic nature.

Meanwhile, prior to performing the averaging process given in Equation (8), the correct detection position is calculated in advance according to the multi-baseline using the detection results of a plurality of comparison-target microlens images. Then, the averaging process given in Equation (8) is performed so that distance calculation can be performed with a high degree of accuracy even if the texture is cyclic in nature. Moreover, the method according to the modification example of the embodiment can also be used in combination with the deformation of the template area explained in the embodiment.

The explanation given above is about the case of adding the detection results for two comparison-target microlens images at the levels L1 and L2. However, that is not the only possible case. Alternatively, for example, it is possible to also add the detection result for a comparison-target microlens image $30_{L3}$ at the level L3 illustrated in FIG. 14.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing method implemented in an imaging device that includes a microlens array including a plurality of microlenses, a main lens configured to guide light from a photographic subject to the microlens array, and an image sensor configured to receive the light after passing through the main lens and the microlens array, the method comprising:
   obtaining an image captured by the image sensor;
   determining a plurality of microlens images, that are formed by the microlenses, from the image captured by the image sensor;
   determining a microlens image of interest and a plurality of comparison-target microlens images from among the plurality of microlens images;
   setting, according to an image height represented by a distance from an optical axis position of the main lens on an imaging surface of the image sensor, an arrangement of a microlens image of interest and a plurality of comparison-target microlens images, wherein the arrangement being set to one of a first arrangement and a second arrangement;
   detecting an amount of image shift between the microlens image of interest and each of the comparison-target microlens images by comparing the microlens image of interest with the comparison-target microlens images; and
   calculating a distance corresponding to the microlens image of interest using the amounts of image shift,
   wherein
   the first arrangement includes the microlens image of interest and the plurality of six comparison-target microlens images, wherein the six comparison-target microlens images are positioned in hexagonal orientations around the microlens image of interest, and each of the comparison-target microlens images is positioned adjacent to the microlens image of interest;
   the second arrangement includes the microlens image of interest and the plurality of comparison-target microlens images, wherein the plurality of comparison-target microlens images are concyclic with the microlens image of interest, excluding a set of comparison-target microlens images that are sequentially adjacent to the microlens image of interest in the radial direction of a circle centered at a center of the image height; and
   the setting sets the first arrangement when a ratio between a first radius of the microlens image of interest having a direction of joining the center of the microlens image of interest and the position and a second radius having a perpendicular direction to the direction of joining is smaller than a threshold value, and sets the second arrangement when the ratio is equal to or greater than the threshold value.

2. The method according to claim 1, wherein the calculating includes calculating the distance using an average of the amounts of image shift.

3. The method according to claim 1, wherein
   the detecting includes
   detecting the amount of image shift by comparing a template area which is set in the microlens image of interest with a matching area which is set in one of the comparison-target microlens images while shifting position of the matching area in the one comparison-target microlens image, and by obtaining a degree of similarity between the template area and the matching area, and
   performing the detecting for two or more comparison-target microlens images of the comparison-target microlens images to obtain the amounts of image shift, and
   the calculating includes calculating the distance using a value obtained by adding the amounts of image shift which have corresponding detected positions.

4. The method according to claim 1, wherein the setting includes setting the arrangement using areas in the image for the microlens image of interest and the comparison-target microlens images, the areas being stored in advance according to the image height.

5. The method according to claim 1, wherein the setting includes setting the arrangement by calculating, according to the image height, areas in the image for the microlens image of interest and the comparison-target microlens images.

6. The method according to claim 1, wherein
   the detecting includes detecting the amount of image shift by comparing a template area set in the microlens image of interest and a matching area set in one of the comparison-target microlens images, and
   the setting includes setting a shape of at least the matching area, from among the template area and the matching area, according to the image height.

7. An imaging device comprising:
   a microlens array including a plurality of microlenses;
   a main lens configured to guide light from a photographic subject to the microlens array;
   an image sensor configured to receive the light after passing through the main lens and the microlens array; and
   a hardware processor that functions as:
   an obtaining unit configured to obtain an image captured by the image sensor;

a setting unit configured to determine a plurality of microlens images, that are formed by the microlenses, from the image captured by the image sensor, to determine a microlens image of interest and a plurality of comparison-target microlens images from among the plurality of microlens images, and to, according to an image height represented by a distance from an optical axis position of the main lens on an imaging surface of the image sensor, set an arrangement of a microlens image of interest and a plurality of comparison-target microlens images, wherein the setting unit sets to one of a first arrangement and a second arrangement, wherein the first arrangement includes the microlens image of interest and the plurality of six comparison-target microlens images, wherein the six comparison-target microlens images are positioned in hexagonal orientations around the microlens image of interest, and each of the comparison-target microlens images is positioned adjacent to the microlens image of interest;

the second arrangement includes the microlens image of interest and the plurality of comparison-target microlens images, wherein the plurality of comparison-target microlens images are concyclic with the microlens image of interest, excluding a set of comparison-target microlens images that are sequentially adjacent to the microlens image of interest in the radial direction of a circle centered at a center of the image height; and the setting unit sets the first arrangement when a ratio between a first radius of the microlens image of interest having a direction of joining the center of the microlens image of interest and the position and a second radius having a perpendicular direction to the direction of joining is smaller than a threshold value, and sets the second arrangement when the ratio is equal to or greater than the threshold value;

a detector configured to detect an amount of image shift between the microlens image of interest and each of the comparison-target microlens images by comparing the microlens image of interest with the comparison-target microlens images; and a calculator configured to calculate a distance corresponding to the microlens image of interest using the amounts of image shift.

* * * * *